Oct. 10, 1944.  B. A. ROGERS  2,359,794
TEMPERATURE DETERMINATION
Filed Aug. 7, 1942
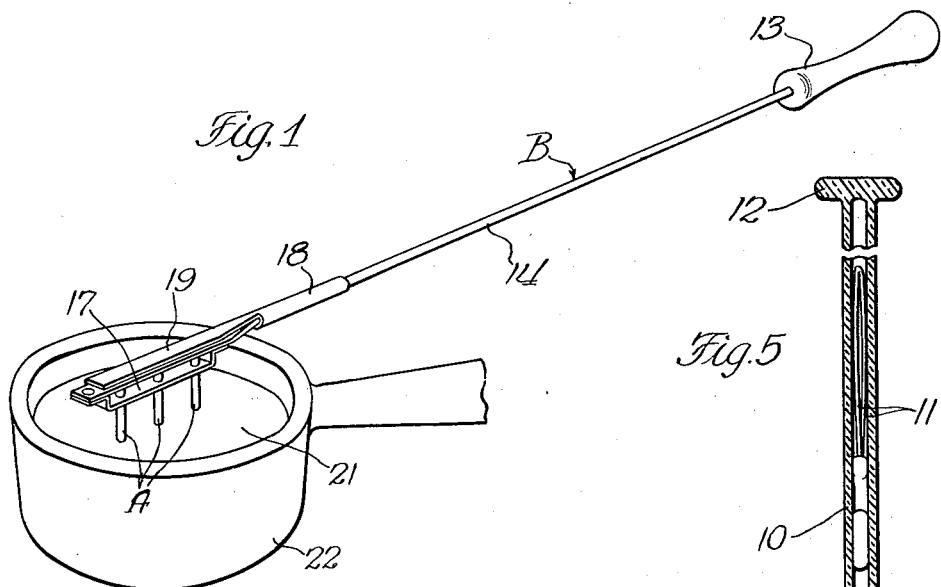
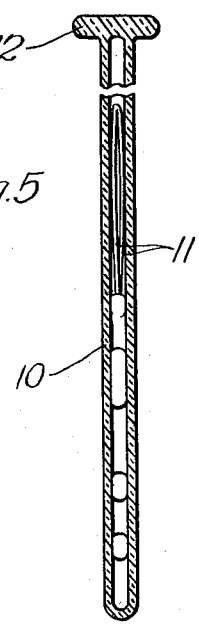
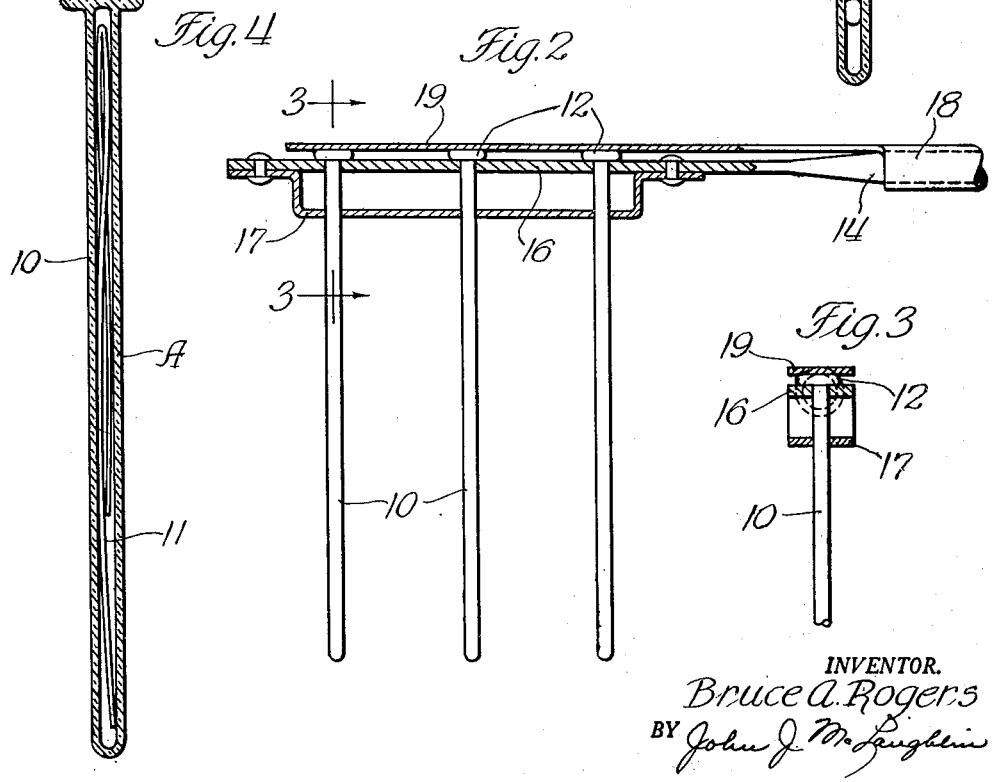
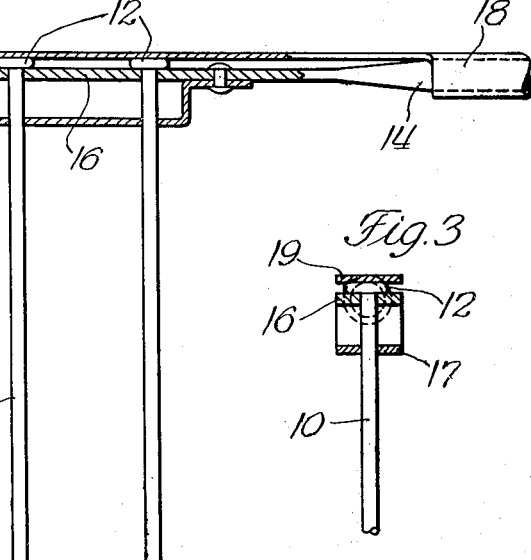
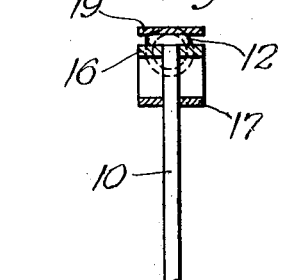
INVENTOR.
Bruce A. Rogers
BY John J. McLaughlin
ATTY.

Patented Oct. 10, 1944

2,359,794

UNITED STATES PATENT OFFICE 2,359,794

TEMPERATURE DETERMINATION

Bruce A. Rogers, Forest Hills, Pa.

Application August 7, 1942, Serial No. 454,079

9 Claims. (Cl. 73—358)

(Granted under the act of March 3, 1883, as amended April 30, 1928; 370 O. G. 757)

This invention described herein may be manufactured and used by or for the Government for governmental purposes, without the payment to me of any royalty thereon.

My invention relates to temperature determination.

One of the earliest methods for determining temperature is what might be termed the comparison method. The use of Seger cones is illustrative of this procedure. This method has been supplanted very largely by the use of thermometers of either the expanding liquid or bi-metallic strip type, particularly in the relatively lower temperature ranges. For higher temperatures, thermocouples of various types have become quite common and in recent years optical pyrometers have been used quite extensively. Modern temperature indicating devices are selected in part because of convenience and the temperatures sought to be determined and in part, also, because of the characteristics of the medium, the temperature of which is to be determined. For example, Seger cones may still be employed satisfactorily in certain types of furnaces where the temperature of the furnace atmosphere near a high temperature flame is to be determined; while, in general, the use of Seger cones and the like, is entirely unsatisfactory where the medium, the temperature of which is to be determined, is a solid or liquid.

Considerable work has been done for the purpose of making available the most suitable method of determining the temperature of molten steel and the like before the pouring thereof into ingots. One instrument used is the optical pyrometer, but this has not been fully satisfactory because there is a large potential source of error due to human errors in color matching, and the temperature is determined only at a surface which is usually covered with slag, and this is seldom a true index of the temperature of the molten metal itself.

The object of my invention is the provision of an improved means for determining temperature, which method and means may be utilized for determining the temperature of molten steel and the like.

In accordance with the general features of the invention, I employ the comparison method but in such a way and employing such equipment that exceedingly accurate and quick determinations may be made. A thermometric insert such as a wire having a known sharp melting point is enclosed in a preferably transparent tubular body of a higher melting point than the wire. The resulting thermometric capsule, suitably styled a "temperature ferret" is introduced by means of a suitable tool into the body of the molten metal for a matter of a very few seconds, but for a sufficient length of time to bring the introduced material up to the temperature of the molten metal. If the wire of known melting point melts, then it is indicated that the temperature of the molten metal is higher than the said known melting temperature, while if the wire of known melting point remains unmelted then it is known that the molten metal is below the said known melting temperature. By employing a series of metals and sharp melting point alloys of known melting temperatures, with a difference in melting temperature between successive members of the series of about 25 degrees F., it is possible to determine quickly and within very close limits the temperature of a molten metal such as steel.

In the drawing, I illustrate some details of one embodiment of apparatus for use in the practice of the invention.

In the drawing

Fig. 1 is a perspective view, in part schematic, illustrating one manner in which the temperature responsive equipment of my invention may be used, Fig. 2 is an enlarged sectional view partly in elevation, showing a series of temperature responsive members mounted in a holder therefor, Fig. 3 is a fragmentary sectional view taken on the line 3—3 of Fig. 2 looking in the direction of the arrows, Fig. 4 is a longitudinal sectional view taken through the temperature ferret, the thermometric insert being shown in elevation, and Fig. 5 is a similar view partly broken away illustrating one may in which the temperature ferret may appear after being inserted in a medium, the temperature of which is to be determined.

For convenience, I shall first refer to the manner of use of the invention and the construction of the temperature ferret as illustrated by the accompanying drawing. The temperature ferret generally indicated by the reference character A comprises an outer envelope of a refractory material in the form of an imperforate tube 10, and a thermometric insert comprising a wire 11 of known melting point. The tube preferably has a head 12 adapted to assist in supporting the temperature ferret in an applicator or holder indicated generally by the reference letter B.

The holder B comprises a handle 13 and a rod 14, the forward end 16 of which is flattened and provided with circular holes for receiving the temperature ferrets. Below the flat portion 16 is a bearing and guide member 17 secured to the flat portion of the rod and also provided with circular holes for receiving the temperature ferrets. A keeper 18 slidable along the rod 14 has a flat portion 19 which is adapted to engage over the heads 12 of the temperature ferrets and hold the temperature ferrets in position.

When employing the temperature ferrets, a desired number thereof is supported in a holder such as B, and a relatively small amount of molten metal 21 is taken into a relatively small ladle 22 (this is a schematic showing) and the temperature ferrets are projected into the molten material in the manner shown in Fig. 1. The temperature ferrets are allowed to remain in the molten material for a few seconds until the thermometric inserts of known melting points have reached the temperature of the molten metal, after which the temperature ferrets are removed and inspected to determine which, if any, of the inserts have been melted.

In the preferred manner of carrying out my invention, I employ relatively very fine wires as the thermometric inserts and so proportion the wires and their enveloping tubes that the wires are raised to the temperature of a molten medium into which they may be projected within ten seconds. I have found that the period of time does not permit appreciable reduction in temperature of the molten medium. Preferably, I employ wires having a diameter of .005 to .015 inch and use an enveloping tube having an outer diameter of .030 to .050 inch and a length of about 2¼ to 2¾ inches. The wall thickness of such a tube, as a rule, will vary, but, in general, it will be in the neighborhood of .010 to .012 inch. I have obtained very good results employing a temperature ferret the parts of which are proportioned approximately as shown in the drawing, Fig. 2 in the drawing showing the parts in twice full scale. I have determined that when a temperature ferret of this general construction and with the parts proportioned as shown in the drawing is employed, the wire is brought up to temperature in a maximum of about 2.6 seconds, in all cases apparently under three seconds and certainly, allowing for margin of experimental error, in not less than five seconds. The period of immersion may be increased somewhat, particularly when the melting point of the metals being controlled is lower than in the case of high melting point steels; or in any instance where there appears to be any advantage in using a longer period of immersion. In general, however, it is desirable to maintain as short an immersion time as possible for reasons which will be apparent to those skilled in the art. My invention makes possible the utilization of a very short immersion time.

The tube or outer capsule is formed of any suitable refractory material, it being understood that by the expression "refractory material" I mean to include any relatively high melting point material which is not affected adversely by the conditions under which it is used. The refractory material should have a melting point at least above the melting point of the molten bath in which it is to be inserted, although at times there may be no objection if there is some softening of the refractory body at the relatively elevated temperatures encountered. There may be a marked difference between the melting temperature of the refractory and the melting temperature of the thermometric insert incorporated therein, but in no instance should the refractory have a melting temperature less than approximately 50 degrees F. higher than the melting temperature of the wire.

One type of refractory substance which I have employed with very good results, is clear fused silica. I have been able to take fused silica shaped in the form of a relatively large tube having a diameter of the order of ½ inch, heat it to a plastic temperature and draw it into thin tubes having an outer diameter of approximately .030 inch. I have found that if the silica tube be supported at its top and a relatively small weight be suspended therefrom at the bottom, a uniform slight pull results which is adequate to produce the requisite draw and convert the larger tube into the form of the relatively small tube or capillary adaptable for my purpose. While fused silica may be satisfactorily employed, other refractory material such as fused alumina and materials such as certain types of porcelain and spars may be used to advantage. Preferably, the capsule of the temperature ferret is transparent in order readily to determine visually whether or not the wire contained therein has been melted. It is not essential, however, that a transparent capsule be employed. Even when a transparent capsule is employed it sometimes happens that it becomes sufficiently discolored in contact with slag or other constituents of a steel charge, so that it is imposible to see through it after it has been removed from the ladle. The very thin wall of the tubular capsule is readily broken, however, and it can be determined whether or not the wire has been melted. Since the capsule will cool off quite rapidly it can be grasped by the fingers shortly after being removed from the molten metal.

Various materials may be employed comprising the thermometric insert but it should in general be a material, preferably a metal, having a relatively sharp melting point and capable of being formed into a wire or strand. Pure metallic elements, or metals which are alloys, are desirable for the purpose, the latter usually having almost as sharp melting points as the elements. In general, alloy compositions in the vicinity of a minimum or maximum melting point, or near a eutectic are desirable; but some alloys not of such composition have sufficiently short melting ranges to make desirable thermometric wire inserts. The material or alloy used should also have such surface tension characteristics in the molten condition that there will be no doubt of its having melted if its melting temperature has been reached. In general, in the case of metals there is a "balling up" in the form of tiny globules in the general manner indicated in Fig. 5 of the drawing. While the difference in the melting points between adjacent members of a series of wires may vary, I have found that for practical operations in the steel industry, a difference of about 15 to 25 degrees C. is more than adequate.

Various types of metals may be selected, the following being sufficiently illustrative of types of wires which may be employed when producing high carbon steels:

| Alloy | Comp., per cent | Temperature of melting | |
|---|---|---|---|
| | | ° C. | ° F. |
| Palladium | | 1,555 | 2,831 |
| Palladium-gold | 5, gold | 1,542 | 2,808 |
| Iron | | 1,530 | 2,786 |
| Palladium-gold | 25, gold | 1,515 | 2,759 |
| Iron-nickel | 8.5, nickel | 1,500 | 2,732 |
| Do | 15, nickel | 1,485 | 2,705 |
| Iron-manganese | 17, manganese | 1,470 | 2,678 |
| Nickel | | 1,455 | 2,651 |

The above list is merely illustrative, as those skilled in the art will understand, but the list is composed of a series of materials having melting points in the range of temperature and at temperature intervals where it is desirable to make tests. For low carbon steels a higher maximum temperature will generally be desirable, and the minimum temperature need not be so low as that of the exemplified series.

The wire used may comprise only a single strand, or it may comprise a strand bent back on itself as shown in the drawing. The use of a single small strand bent back on itself has the advantage of producing a thin section which is more readily brought up to temperature, it gives sufficient bulk so that there will be no difficulty in determining by only a casual inspection whether or not melting has occurred and finally in the usual instance where the melting temperature of the wire is just barely reached and only for an instant, there will be a slight fusing together of the two sections of the strand, and thus it will be known that the melting point was actually reached. From the above description it will be obvious that the expression "wire" is employed in a relatively broad sense to mean a strand of generally wire like character and formed of a material having the general characteristics of a wire so far as the functioning of the present invention is concerned.

The temperature ferrets of my invention are produced and used in the form of groups or series, each adapted for utilization for a different specific purpose in making the ferrets available to the user, each series is identified by appropriate markings common to all of the members of the series, and the individual members of the series are marked to identify them from each other. I have found various ways of accomplishing this desired result. One is to shape the head of all ferrets in a series in an identical manner but shape the heads of different series differently. Then on the top or generally flat portion of each head, a number or letter is applied to distinguish the individual ferrets in a series from each other.

Looking at the drawing, the head 12 is shown generally round. It may, however, be triangular, square, leaf shape or any desirable shape, so that no series of ferrets has the identical marking. This is not to be construed as meaning that, functionally, ferrets of the different series may not be identical. Thus, if I provide a series of temperature ferrets for determining the temperature of high carbon steels, and another series of temperature ferrets to determine the temperature of low carbon steels, some of the ferrets of the two series may be identical in the high temperature portion of the high carbon steels and the low temperature portion of the low carbon steels. The individual letters or figures or other marks are applied in any one of several ways such as by stenciling or printing, using a printing or ink medium which readily bonds to glass such as a silicate or the like in which metallic pigments such as cobalt pigments are used.

While the temperature ferrets of my invention are suitably used in the exact manner discussed hereinabove, it is to be understood that they may be employed in other ways. A principal use is, of course, to determine the temperature of the molten metal and, as a rule, as in the case of steels, the measurement will be made by removing a spoonful of metal from the main body. There is no objection, however, to introducing the temperature ferrets into the main body of the metal as, indeed, this procedure may be preferable under certain conditions. The temperature ferrets may be used for other purposes not directly related to the temperature of a metal. They may be employed, for example, to check temperatures in different parts of furnaces and furnace charges, in heating baths of various sorts and in a variety of metallurgical and chemical processes where the employment of thermocouples would involve too much expense or would not be practical from an engineering point of view. I may, for example, employ the temperature ferrets of my invention for the purpose of determining the rate at which specimens of mold sand and the like are heated in connection with operations both in core baking and the pouring of metal into sand molds. This is merely illustrative of many types of uses wherein relatively very fine wire is protected under such circumstances that it will be affected only by a temperature change and will be readily affected by the temperature change because of the rapidity with which the wire will attain the temperature of its immediate surroundings.

I have described my invention in considerable detail so that those skilled in the art will understand how to practice the same. The scope of the invention, however, is defined in the claims.

What I claim as new and desire to protect by Letters Patent of the United States is:

1. Temperature indicating apparatus of a character and for the purpose described, comprising a series of wires of relatively small cross section and refractory means enveloping the same, said wires having different but related melting points, all, however, below the melting point of the said refractory means, and the relative dimensions and positions of the wires and refractory means being such that the wires substantially reach the temperature of a fluid into which the apparatus is introduced within approximately ten seconds.

2. Apparatus as defined in claim 1, wherein said refractory means includes a single thin walled imperforate tube surrounding each wire, a holder being provided for supporting a plurality of tubes of a series.

3. Temperature indicating apparatus of a character and for the purpose described comprising a single wire having a sharp melting point and of a diameter between about 0.005 and 0.015 of an inch, and an enveloping tube of refractory material, the outer diameter of said tube being between about 0.030 and 0.050 of an inch.

4. Temperature indicating apparatus of a character and for the purpose described comprising a single wire having a sharp melting point and of a diameter between about 0.005 and 0.015 of an inch, and an enveloping tube of refractory material, the outer diameter of said tube being between about 0.030 and 0.050 of an inch, said tube having a head at one end thereof, whereby to facilitate supporting the same in a holder.

5. Temperature indicating apparatus of a character and for the purpose described comprising a single wire having a sharp melting point and of a diameter between about 0.005 and 0.015 of an inch, and an enveloping tube of refractory material, the outer diameter of said tube being between about 0.030 and 0.050 of an inch, said wire having a section bent back on itself in the manner and for the purpose described.

6. Temperature indicating apparatus of a character and for the purpose described comprising a relatively very fine wire with a sharp melting point entirely enclosed by a headed transparent refractory tube, the wire and tube being so constructed and arranged that the wire will reach the temperature of a molten metal bath in which it is introduced within ten seconds.

7. Temperature indicating apparatus including a series of small wires of sharp melting point, said wires melting at different temperatures, and together covering a temperature range, and a plurality of thin refractory tubes, each wire being housed in a tube, the tubes and wires comprising a series of temperature ferrets, means for distinguishing said series of temperature ferrets from another series of such temperature ferrets the wires of which cover a different temperature range, and means for distinguishing the individual members of the series from each other.

8. Temperature indicating apparatus of a character and for the purpose described, comprising a plurality of imperforate fused silica envelopes, each such envelope enclosing a single wire having a sharp melting point, said wires having different melting points, said fused silica envelopes and wires being of small cross section and so dimensioned that when introduced into a molten metal bath, temperature equilibrium will be established between the said wire and said bath within ten seconds.

9. Temperature indicating apparatus for determining the internal temperature of a molten steel body which comprises a shaped metal test portion having a diameter between about 0.005 inch and 0.015 inch, combined with silica enveloping means therefor having an outer diameter between about 0.03 inch and 0.05 inch, and means for projecting and withdrawing said enveloped test portion into and from a molten steel body.

BRUCE A. ROGERS.